(12) United States Patent
Halfon

(10) Patent No.: US 12,470,365 B2
(45) Date of Patent: Nov. 11, 2025

(54) POINT-TO-POINT ENCRYPTION/DECRYPTION

(71) Applicant: Bank of America Corporation, Charlotte, NC (US)

(72) Inventor: Zvulun Halfon, Woodland Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 268 days.

(21) Appl. No.: 18/093,855

(22) Filed: Jan. 6, 2023

(65) Prior Publication Data

US 2024/0235814 A1    Jul. 11, 2024

(51) Int. Cl.
*H04L 9/06* (2006.01)

(52) U.S. Cl.
CPC .................................... *H04L 9/065* (2013.01)

(58) Field of Classification Search
CPC ....................................................... H04L 9/065
See application file for complete search history.

(56) References Cited

U.S. PATENT DOCUMENTS

| 8,995,652 B1 | 3/2015 | Thompson |
| 11,310,078 B2 | 4/2022 | Ethier et al. |
| 2001/0021254 A1* | 9/2001 | Furuya ................. H04L 9/0625 380/259 |
| 2006/0120521 A1* | 6/2006 | Whitehead ............ H04L 9/0662 380/46 |
| 2008/0095366 A1* | 4/2008 | Taniguchi .......... H04N 21/4623 380/239 |
| 2008/0101607 A1* | 5/2008 | Liang .................... H04L 9/0838 713/400 |
| 2020/0287710 A1 | 9/2020 | Thompson |
| 2021/0266175 A1* | 8/2021 | Bernsen ............... H04L 9/0861 |

* cited by examiner

*Primary Examiner* — Abu S Sholeman
(74) *Attorney, Agent, or Firm* — Weiss & Arons LLP

(57) ABSTRACT

A point-to-point encryption and decryption system is provided. The system includes an exclusive OR gate located at the encryption side and a second exclusive OR gate at the decryption side. The system also includes a catalogued random data store feeding into the first input of the exclusive OR gate and a second catalogued random data store for feeding the second exclusive OR gate and a visible medium. The exclusive OR gate receives a stream of unencrypted data and the exclusive OR gate forms a stream of encrypted data at the output of the exclusive OR gate based on the unencrypted data and the catalogued random data store. The exclusive OR gate transmits, via the visible medium, the stream of encrypted data to the second exclusive OR and the second exclusive OR gate receives the stream of encrypted data and, in response thereto, outputs a stream of unencrypted data.

9 Claims, 4 Drawing Sheets

POINT-TO-POINT ENCRYPTION/DECRYPTION

FIELD OF TECHNOLOGY

Aspects of the disclosure relate to encryption and decryption of signals.

BACKGROUND OF THE DISCLOSURE

Securing data is perhaps one of the most important tasks in many businesses and especially for financial institutions (FIs). For example, when an accountant data cloud is breached, hundreds of tax filings can be stolen. These tax filings may contain personal data. Such personal data can be used to target people for fraud and other similar acts.

If data is securely encrypted, the aforementioned exemplary breach would not have occurred. Encryption algorithms exist and are being used in many cases. However, those encryptions can be breached given the right tools and time.

It would be desirable to provide a method that will make point-to-point encryption substantially more difficult to decrypt by a third party.

It would be yet more desirable to provide a method that provides point-to-point encryption that is relatively quicker and less cumbersome to decrypt at the point of decryption.

SUMMARY

A method for providing point-to-point encryption and decryption is provided. The point-to-point encryption and decryption may utilize, at an encryption side of the point-to-point encryption and decryption, an exclusive OR gate (alternatively, an "Ex-OR gate"). The Ex-OR gate may have a first input, a second input and an output. At a decryption side of the point-to-point encryption and decryption, there may be an exclusive OR gate having a first input, a second input and an output. The method may include inputting a random data feed into a first input of the exclusive OR gate and inputting a stream of unencrypted data into the second input of the exclusive OR gate.

At the output of the exclusive OR gate, the method forms a stream of encrypted data. The method may then include transmitting the stream of encrypted data through a visible medium to the decryption side of the point-to-point encryption and decryption. The method may then input the stream of encrypted data into the first input of the exclusive OR gate at the decryption side, input a second instance of the catalogued random data feed into a second input of the exclusive OR gate at the decryption side and output from the output of the exclusive OR gate at the decryption side, the stream of unencrypted data.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
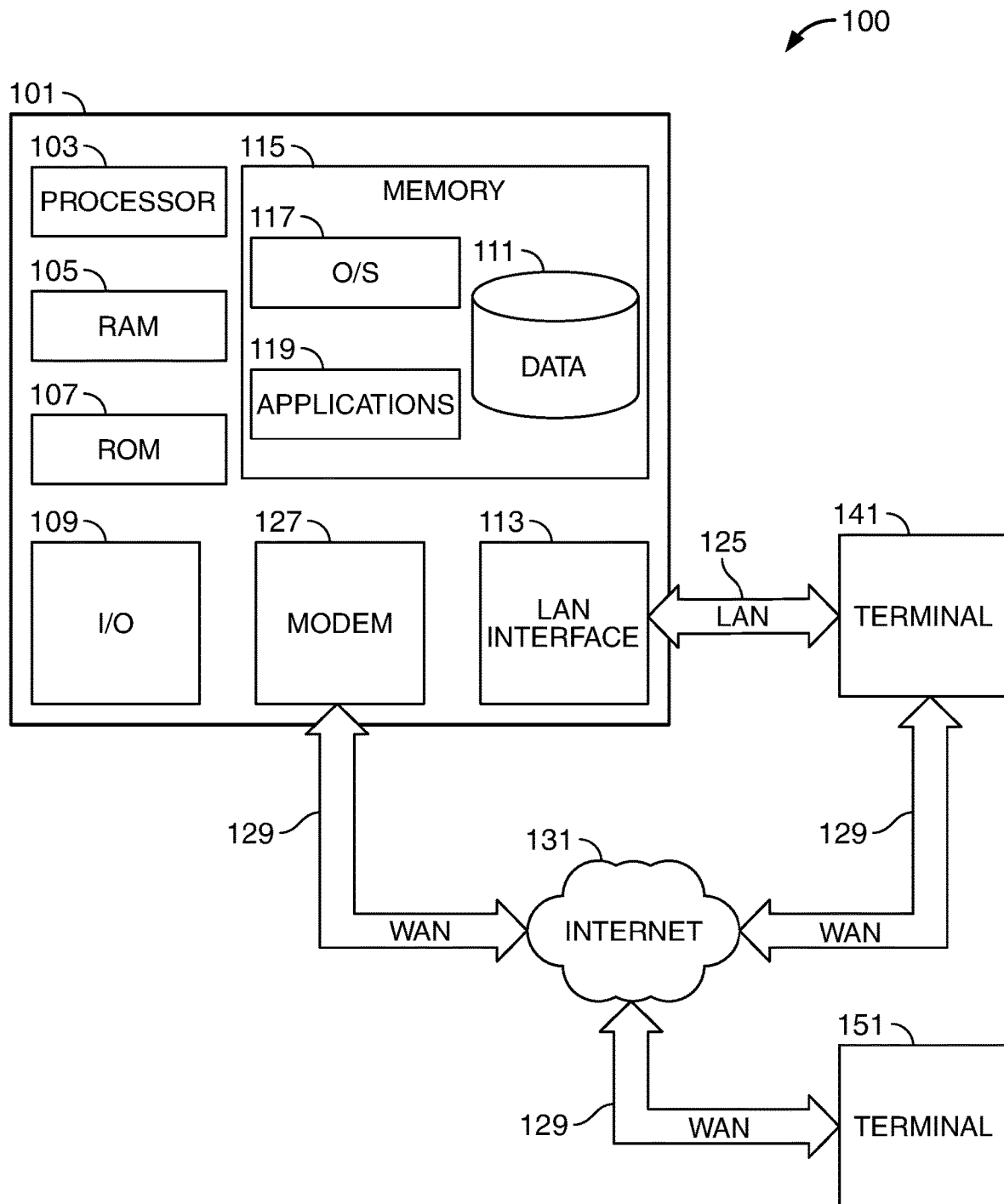
FIG. 1 shows an illustrative system in accordance with principles of the disclosure.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

A method for providing point-to-point encryption and decryption is provided. The point-to-point encryption and decryption may involve an encryption and decryption circuit. The circuit may utilize, at an encryption side of the point-to-point encryption and decryption circuit, an exclusive OR gate having a first input, a second input and an output, and, at a decryption side of the point-to-point encryption and decryption, an exclusive OR gate having a first input, a second input and an output.

An exclusive-OR logic function is a useful circuit in the current embodiment for the reasons that follow. The "exclusive OR gate" or, in the alternative, "Ex-OR gate" is a type of digital logic gate commonly used in arithmetic operations. In the current application, the Ex-OR gate sums the value provided by a catalogued random number and data for encryption. It should be noted that the catalogue of random numbers used to produce the catalogued random number should preferably be of high quality—i.e., produced by an algorithm that is not easily deciphered—in order to further protect the security of the overall point to point encryption/decryption.

There are two other types of digital logic gates which although they are not a basic gate in their own right as they are constructed by combining together other logic gates, their output Boolean function is important enough to be considered as complete logic gates. These two "hybrid" logic gates are called the Ex-OR Gate and its complement the Exclusive-NOR ("Ex-NOR") Gate. Use of either of these gates in the circuits according to the invention is all within the scope of the current disclosure.

For a 2-input OR gate, if A="1", OR B="1", OR BOTH A+B="1" then the output from the digital gate must also be at a logic level "1" and because of this, this type of logic gate is known as an Inclusive-OR function. The logic gate gets its name from the fact that it includes the case of Q="1" when both A and B="1".

If, however, a logic output "1" is obtained when ONLY A="1" or when ONLY B="1" but NOT both together at the same time, giving the binary inputs of "01" or "1 0", then the output will be "1". This type of gate is known as an Exclusive-OR function or more commonly an Ex-Or function for short. This is because its Boolean expression excludes the "OR BOTH" case of Q="1" when both A and B="1".

In other words, the output of an Exclusive-OR gate ONLY goes "HIGH" when its two input terminals are at "DIFFERENT" logic levels with respect to one other.

As such, when the values at one input, and the output, of the Ex-OR gate are known values, then the other input can be reliably deduced. For example, in the following truth table with A and B as inputs and Q as an output, if B and Q are known, then A can be deduced to a certainty (based on the known Ex-OR logic).

| A | B | Q |
|---|---|---|
| 0 | 0 | 0 |
| 0 | 1 | 1 |
| 1 | 0 | 1 |
| 1 | 1 | 0 |

Therefore, an Ex-OR gate can be used for point-to-point encryption/decryption when the catalogue of random numbers is known and stored at both the encryption point and the decryption point.

Accordingly, a first step of the method may include inputting a catalogued random data feed into a first input of the exclusive OR gate at the encryption side of the point-to-point encryption and decryption circuit. The encryption side may also include inputting a stream of unencrypted data into the second input of the exclusive OR gate at the encryption side of the point-to-point encryption and decryption circuit. The exclusive OR gate may be used to form a stream of encrypted data at the output of the encryption side.

The method may further include transmitting the stream of encrypted data through a visible medium (such as a public domain medium) to the decryption side of the point-to-point encryption and decryption circuit. Thereafter, the method may include inputting the stream of encrypted data into the first input of the exclusive OR gate at the decryption side, inputting a second instance of the catalogued random data feed into a second input of the exclusive OR gate at the decryption side; and outputting, from the output of the exclusive OR gate at the decryption side, the stream of unencrypted data.

It should be noted that a location for initiating the input from the catalogue at the decryption side may preferably be transmitted from the encryption side to the decryption side in an unencrypted fashion. This, however, presents a low risk to the data security overall because such an unencrypted transmission involves only a synchronization point, and not the catalogue of random data itself. With respect to the catalogue of random data, this information should be instantiated both at the encryption side and the decryption side. Accordingly, this information is not transmitted between the two sides through a visible domain. It should be noted further that when the synchronization point information is transmitted between the two sides in an unencrypted fashion, it may preferably be transmitted as part of an unrelated set of information, making it almost impossible to glean from the combined transmission of the sync point (as well as whatever rules are needed for reading the catalogued random data) and the unrelated set of information with which the synchronization point is being transmitted.

Some embodiments of methods according to the invention may include determining, at the encryption side of the point-to-point encryption and decryption circuit, a synchronization point (alternatively referred to herein as "a sync point") point for the catalogued random data feed. In some embodiments, the transmitting may be conducted via the visible medium while the sync point is an unencrypted digital signal.

Furthermore, the inputting of the second instance of the catalogued random data feed may be based on the location in the catalogued random data feed identified by the sync point.

The transmitting, through the visible medium of, the sync point as an unencrypted digital signal may be supplemented by information that relates to a first predetermined pattern for inputting the catalogued random data feed into the first input of the exclusive OR gate at the encryption side. As such, the inputting the catalogued random data feed into the first input of the exclusive OR gate at the encryption side may include inputting the catalogued random data feed into the first input of the exclusive OR gate at the encryption side according to a predetermined pattern as well.

The predetermined pattern may for example input the catalogued random data feed backward from the sync point. In certain embodiments, the predetermined pattern inputs a first one out of a predetermined number of inputs into the catalogued random data feed. Any predetermined pattern of inputs from the catalogued random data is considered within the scope of the current disclosure.

The inputting the catalogued random data feed into the first input of the exclusive OR gate at the decryption side includes inputting the catalogued random data feed into the first input of the exclusive OR gate at the decryption side according to the predetermined pattern.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
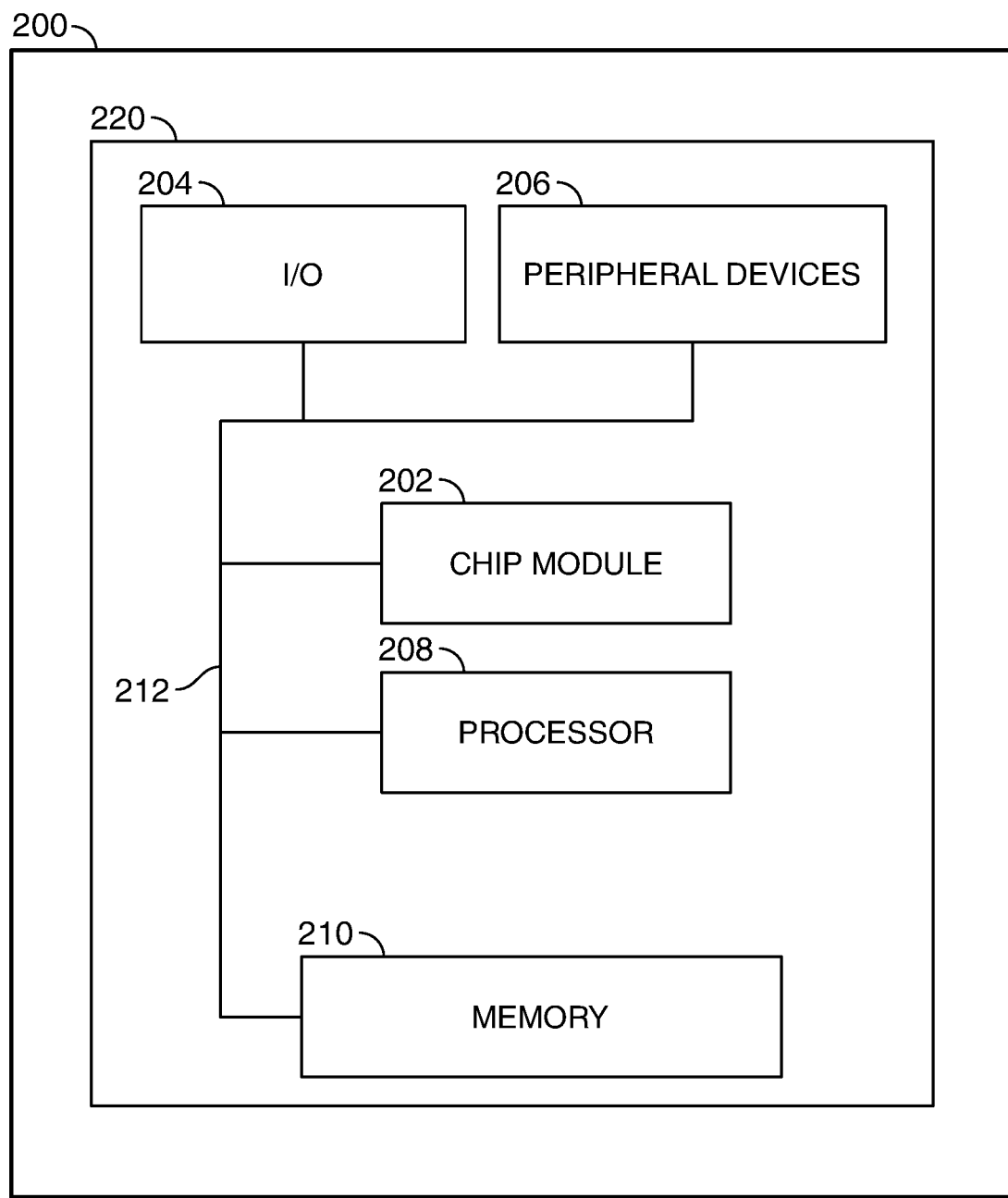
FIG. 2 shows an illustrative system in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
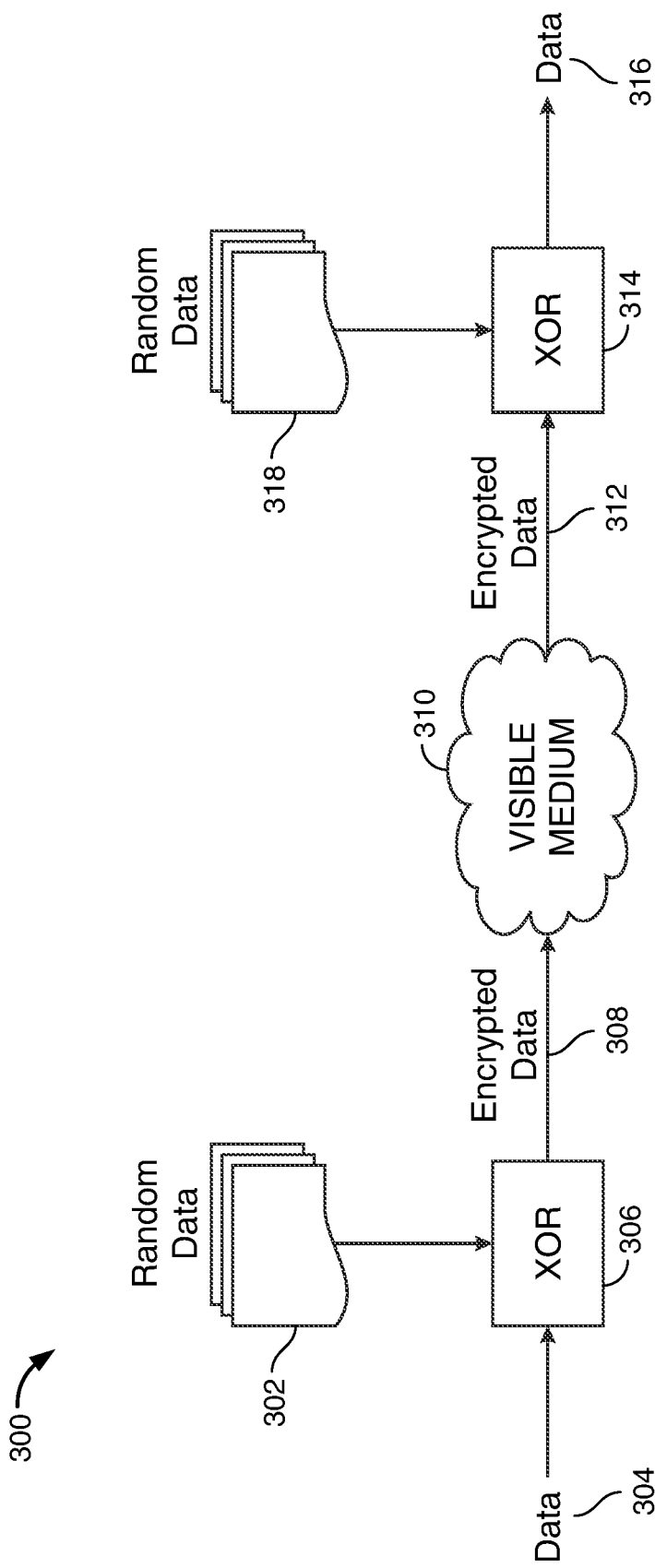
FIG. 3 shows a schematic system diagram in accordance with the embodiments of the disclosure.

FIG. 3 shows a schematic system diagram in accordance with the embodiments of the disclosure. At 304, data that is to be encrypted according to the point-to-point encryption scheme 302 of the disclosure is shown. The data is fed into one input of the Ex-OR gate 306, while data from a catalogue of random data at 302 is fed into a second input of Ex-OR gate 306. In response to the two inputs streams, Ex-OR gate 306 preferably outputs encrypted data at 308.

Encrypted data 308 is preferably sent to the receiving Ex-OR gate 314 via visible medium 310—e.g., a medium that exists in the public domain. As such, the encrypted data may be the subject of an attack such as a man-in-the middle attack or other such cyber-attack. However, encrypted data 308 is non-decipherable absent the catalogued random data (stores and) feeds located at either 302 and/or 318. Therefore, the risk of a security breach is limited to parties or entities that can access catalogued random data (stores or) feeds located at 302 or 318.

In order to decrypt encrypted data 312, encrypted data 312 is Ex-ORed with catalogued random data feed located at 318 to produce unencrypted data 316.

The foregoing embodiments preferably provide a system for point-to-point encryption decryption while preserving a high level of information security at preferably high efficiency. Other methods and systems are available, such as conventional systems that use network links to switch nodes to facilitate some sort of encryption, but that is not the subject matter of the current disclosure. Rather, the current disclosure is directed to a robust, yet quick and relatively-low-resource-consumptive approach to point-to-point encryption and decryption.

Figure 4:
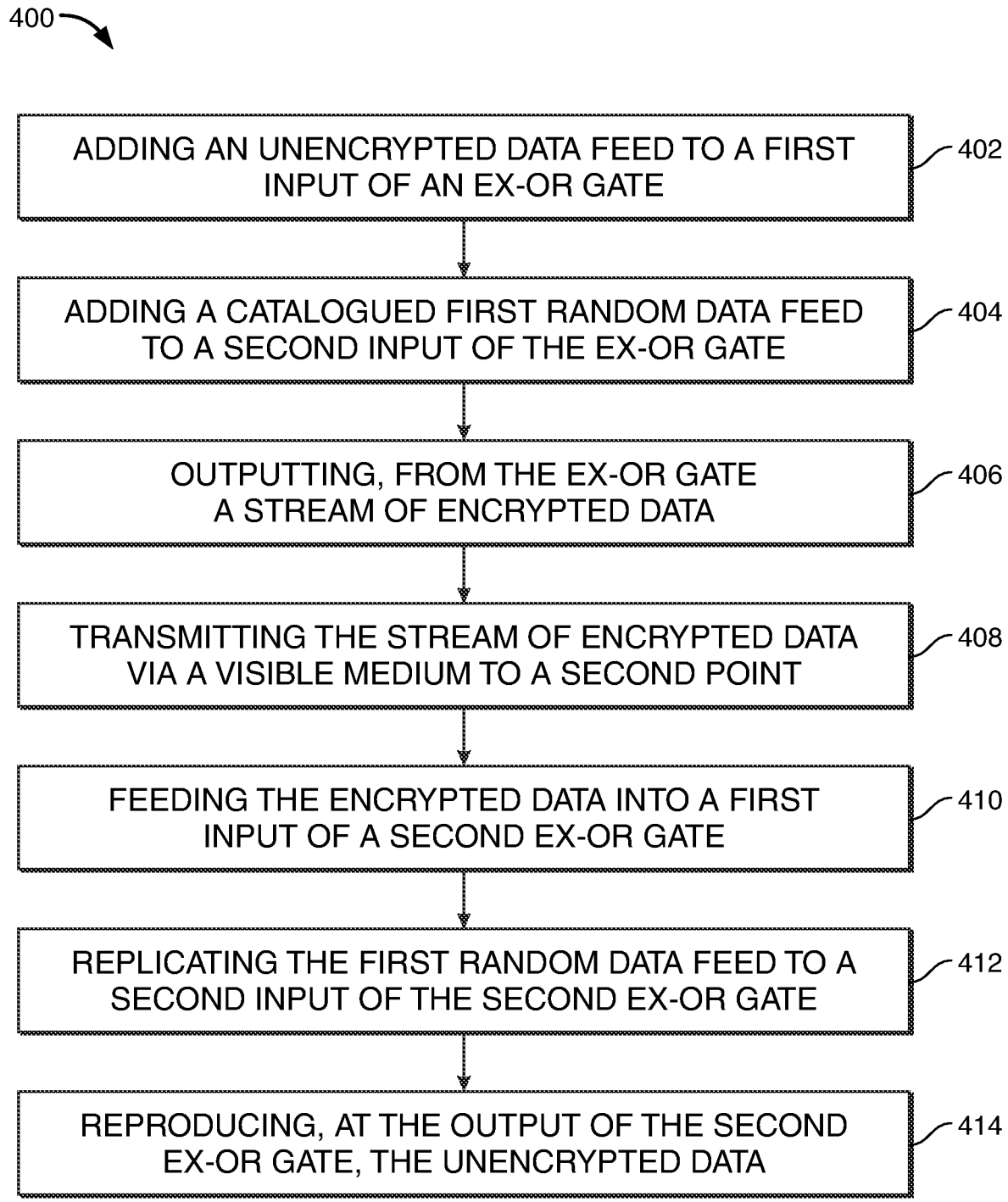
FIG. 4 shows an illustrative flow diagram in accordance with the embodiments of the disclosure.

FIG. 4 shows an illustrative flow diagram that illustrates a method according to the disclosure. The method shows providing point-to-point encryption and decryption at 400. The method includes taking an unencrypted data feed and adding as an input to a first Ex-OR gate, as shown in 402. The method includes taking a first catalogued random data feed, and adding it to a second input of the Ex-OR gate, as shown at 404.

Thereafter, the method includes outputting (from a first point) a feed from the output of the Ex-OR gate, as shown at 406. The outputted feed becomes a stream of encrypted data. This encrypted data is transmitted, via a visible medium such as a public domain medium, to a second point—thus the term point-to-point encryption and decryption, as shown at 408.

At the second point 410, the encrypted data is fed into a first input of a second Ex-OR gate, and, at 412, a replica of the first random data feed is fed into a second input of the second Ex-OR gate. At the output of the second Ex-OR gate the unencrypted data is reproduced.

Thus, methods and apparatus for POINT-TO-POINT ENCRYPTION/DECRYPTION are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for providing point-to-point encryption and decryption, the point-to-point encryption and decryption involving an encryption and decryption circuit, the point-to-point encryption and decryption circuit utilizing, at an encryption side of the point-to-point encryption and decryption circuit, an exclusive OR gate having a first input, a second input and an output, and, at a decryption side of the point-to-point encryption and decryption circuit, an exclusive OR gate having a first input, a second input and an output, the method comprising:

inputting a catalogued random data feed, said catalogued random data feed produced by an algorithm, into a first input of the exclusive OR gate at the encryption side of the point-to-point encryption and decryption circuit;

inputting a stream of unencrypted data into the second input of the exclusive OR gate at the encryption side of the point-to-point encryption and decryption circuit;

forming a stream of encrypted data at the output of the encryption side;

transmitting the stream of encrypted data through a visible medium to the decryption side of the point-to-point encryption and decryption circuit;

inputting the stream of encrypted data into the first input of the exclusive OR gate at the decryption side;

inputting a second instance of the catalogued random data feed into a second input of the exclusive OR gate at the decryption side, said inputting of the second instance of the catalogued random data feed into a second input of the exclusive OR gate at the decryption side operable to be initiated at a predetermined input location in the catalogued random data feed, wherein the predetermined input location comprises a synchronization ("sync") point, said sync point providing a starting point for decrypting the catalogued random data feed;

transmitting, in an unencrypted fashion, the predetermined input location from the encryption side to the decryption side; and outputting, from the output of the exclusive OR gate at the decryption side, the stream of unencrypted data.

2. The method of claim 1 further comprising transmitting, through the visible medium, the sync point as an unencrypted digital signal.

3. The method of claim 1 further comprising scheduling the inputting of the second instance of the catalogued random data feed based on the sync point.

4. The method of claim 1 further comprising transmitting, through the visible medium, the sync point as an unencrypted digital signal and a first predetermined pattern for inputting the catalogued random data feed into the first input of the exclusive OR gate at the encryption side.

5. The method of claim 1, wherein the inputting the catalogued random data feed into the first input of the exclusive OR gate at the encryption side comprises inputting the catalogued random data feed into the first input of the exclusive OR gate at the encryption side according to a predetermined pattern.

6. The method of claim 5 wherein the predetermined pattern inputs the catalogued random data feed backward.

7. The method of claim 5 wherein the predetermined pattern inputs a first one out of a predetermined number of inputs into the catalogued random data feed.

8. The method of claim 7, wherein the inputting the catalogued random data feed into the first input of the exclusive OR gate at the decryption side comprises inputting the catalogued random data feed into the first input of the exclusive OR gate at the decryption side according to the predetermined pattern.

9. The method of claim 1 wherein the visible medium is a public domain medium.

* * * * *